US008135642B1

(12) United States Patent
Krause

(10) Patent No.: US 8,135,642 B1
(45) Date of Patent: Mar. 13, 2012

(54) RESILIENT MESSAGING SYSTEM AND METHOD

(75) Inventor: Alan S. Krause, Fairway, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 989 days.

(21) Appl. No.: 11/349,521

(22) Filed: Feb. 7, 2006

(51) Int. Cl.
*G06Q 40/00* (2006.01)

(52) U.S. Cl. ............................ 705/38; 705/35; 705/39

(58) Field of Classification Search ............... 705/1, 35, 705/38; 379/15.03; 455/405–406
See application file for complete search history.

(56) References Cited

U.S. PATENT DOCUMENTS

| | | | | |
|---|---|---|---|---|
| 4,893,248 | A | * | 1/1990 | Pitts et al. ..................... 705/400 |
| 4,958,368 | A | * | 9/1990 | Parker ........................ 379/91.01 |
| 5,615,408 | A | * | 3/1997 | Johnson et al. ............... 455/405 |
| 6,567,791 | B2 | * | 5/2003 | Lent et al. ......................... 705/38 |
| 7,269,407 | B2 | * | 9/2007 | Carmon et al. ............... 455/406 |
| 7,609,825 | B2 | * | 10/2009 | Green et al. ............. 379/114.04 |
| 2003/0093302 | A1 | * | 5/2003 | Quido et al. ........................ 705/4 |
| 2004/0058669 | A1 | * | 3/2004 | Carmon et al. ............... 455/406 |
| 2004/0107161 | A1 | * | 6/2004 | Tanaka et al. ................... 705/38 |
| 2007/0143743 | A1 | * | 6/2007 | Cobb et al. ..................... 717/127 |
| 2008/0288393 | A1 | * | 11/2008 | Toms ............................... 705/38 |

OTHER PUBLICATIONS

Immigrants struggle to establish credit in America; Pat Curry o Bankrate.com; Dec. 8, 2000.*
New FICO Score: Lenders Assess Credit Risks through Nontraditional Sources; Nemal Perera; creditguard.org; Nov. 1, 2004.*
§ Equifax Launches Internet Commerce Solutions for the Telecommunications and Utilities Industries. (Feb. 28). PR Newswire,1. Retrieved Nov. 2, 2011, from Business Dateline. (Document ID: 50354740).*
§ Couch, Mark P. (Apr. 15, 1998). AT&T's huge data-transfer network breaks down Malfunction hobbles thousands of clients. Fort Worth Star—Telegram,p. 1. Retrieved Nov. 2, 2011, from Business Dateline. (Document ID: 44832881).*
§ Garry, Michael. (Mar. 1995). When disaster strikes. Progressive Grocer, 74(3), 73. Retrieved Nov. 2, 2011, from ABI/INFORM Global. (Document ID: 5351958).*

* cited by examiner

*Primary Examiner* — Alexander Kalinowski
*Assistant Examiner* — Abhishek Vyas

(57) ABSTRACT

A computer-implemented system for processing a customer application for a wireless telecommunications device is provided. The system includes a first credit component to obtain first credit information for a customer and a second credit component maintaining default credit information. The system includes a credit processor and a payment component. Where the first credit information is available the credit processor uses the first credit information otherwise it uses the default credit information to process the customer application. The payment component uses a first payment verification to verify a customer payment. When the first payment verification is not accessible, the payment component provides a payment identification and continues processing the customer application until the first payment verification is obtained. When the payment component is unable to obtain the first payment verification and the customer application is otherwise completed, the payment component validates the customer payment to complete the customer application.

20 Claims, 3 Drawing Sheets

RESILIENT MESSAGING SYSTEM AND METHOD

CROSS-REFERENCE TO RELATED APPLICATIONS

None

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to an architecture and system for processing a customer application for a wireless communication device and more particularly to an advanced method of selling, collecting money and provisioning wireless communication devices in a retail store.

BACKGROUND OF THE INVENTION

In the traditional retail environment, the prospective purchaser visits a retail store, typically either operated by a cellular telephone carrier or by an independent retailer. The customer obtains information from a sales clerk and manually fills out a contract. Once the contract has been completed, the sales clerk transcribes the relevant information into a computer system, obtains a credit approval, and completes the transaction by collecting money for the wireless device and provisioning the wireless device from the store's inventory.

SUMMARY OF THE INVENTION

According to one embodiment, the present disclosure is directed to a system for processing a customer application, comprising a first credit component operable to obtain the first credit information for a customer, a second credit component operable to obtain a second credit information for the customer, a third credit component operable to provide default credit information for the customer and a credit processor operable where the first credit information is available to use the first credit information to process the customer application. When the first credit information is unavailable and the second credit information is available, the credit processor is operable to use the second credit information to process the customer application. When the first and second credit information are unavailable, the credit component is operable to use the default credit information to process the customer application.

According to another embodiment, the present disclosure is directed to a system for processing a customer application for a wireless communication device, comprising a first credit component, a second credit component, a third credit component, a credit processor, a payment component, a provisioning component and an automator component. The first credit component is operable to obtain the first credit information for a customer. The second credit component is operable to obtain the second credit information for a customer. The third credit component is operable to provide default credit information for a customer. The credit processor is operable where the first credit information is available to use the first credit information to process the customer application. When the first credit information is unavailable and the second credit information is available, the credit processor is operable to use the second credit information to process the customer application. When the first and second credit information are unavailable, the credit component is operable to use the default credit information to process the customer application. The payment component is operable to obtain the first payment verification for a customer payment. When the payment component is unable to obtain the first payment verification, the payment component is operable to provide a payment identification to promote continued processing of the customer application until the first payment verification is obtained. When the payment component is unable to obtain the first payment verification and the customer application is otherwise completed, the customer payment is validated to complete the customer application. The provisioning component is operable to assign a telephone number to a wireless device. When the first source is unavailable, the provisioning component is operable to obtain the telephone number from a second source having reserved telephone numbers.

According to another embodiment, the present disclosure is directed to a computer implemented method for processing a customer application for a wireless account. This method comprises attempting to obtain credit information on the customer from a first credit source, attempting to obtain a first payment verification for a customer payment related to the customer application using a first verification source and using a default payment information when the first payment verification is unavailable to complete processing the customer application. When the credit information on the customer is unavailable from the first credit source, an attempt is made to obtain credit information on the customer from a second credit source. When the credit information on the customer is unavailable from the first and second credit sources, default credit information is assigned to the customer for processing the application. When the first payment verification is unavailable from the first verification source, payment identification is provided to promote continued processing of the customer application until the first payment verification is obtained.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

Figure 1:
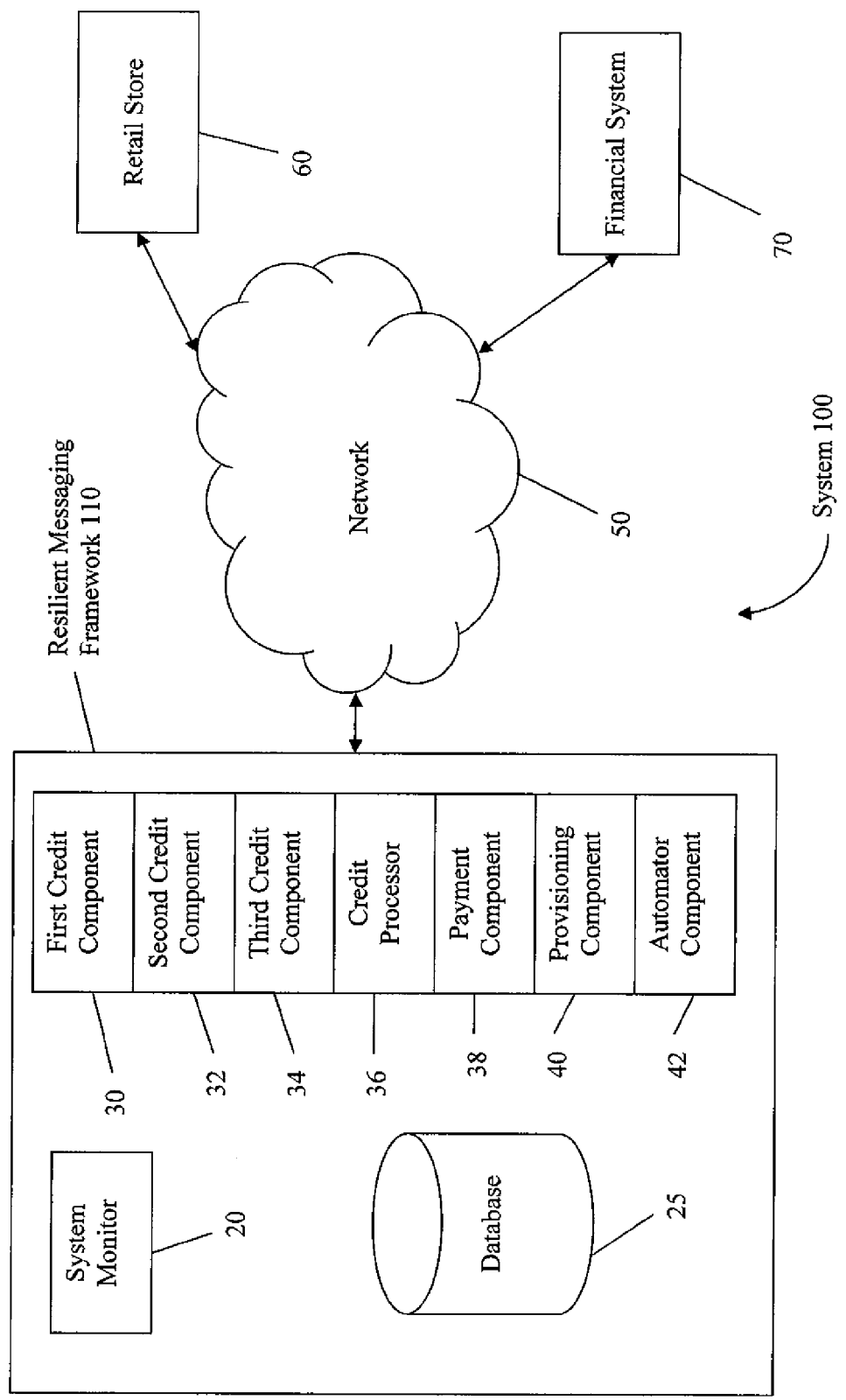
FIG. 1 is a block diagram that depicts a telecommunication messaging system for the sale, activation and provisioning a wireless data communication device.

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

Computer systems include hardware and software. Software includes a list of instructions that are created to operate and manage hardware components that make up a computer system. Typically, computer systems include a variety of hardware devices that interface with one another. The computer system can be a stand-alone type or a networked type. In a networked-type computer system, a plurality of distinct devices are connected to a network and thus communication between these distinct devices is enabled via the network. For many business applications, it is important that transactions be completed in a predictable manner.

Many telecommunications providers sell products, such as wireless phone service through resellers or retail stores and these resellers may sell phones and services for multiple telecommunications providers. Typically, if any of the backend computer systems (e.g., billing system, number management system, number porting system) is down or unable to respond within a set time, the retail store computer system shuts down or does not operate effectively. Once the retail store computer system or link to a particular telecommunication provider is down or is perceived to be down, the retail store sales representatives may no longer attempt to sell the products and services of that telecommunications service provider. Instead, the retail store sales representative sells a competitor's products and services. This may be the case because the retail store sales representatives are paid a commission on the completed sale of a product or service regardless of the providers whose products and services are sold. Although the telecommunications service provider backend computer system may only be down for a brief period, the retail store sale representatives may not resume selling the telecommunications service provider's products and services for an extended period of time.

The present disclosure is directed, according to one embodiment, to a system that allows a retail store to complete a transaction for the sale of telecommunication products and services where there is an outage with regards to any, some or all of the computer systems necessary to complete the transaction. The system accomplishes this objective through a series of fallback positions. The first best data is used when it is available and where the first best data is not available the next best data is used. Where the first best data and the next best data are both unavailable, the system uses whatever critical information is available, with the objective generally being to complete the transaction. The objective is to insulate the retail stores from any computer system outages where access to the computer systems is needed to complete the transaction. Once the transaction is complete, the system may continue to follow-up and complete the transaction processing once the previously unavailable information becomes available again. This system keeps the retail store customer service representatives selling the telecommunications service provider's products and services until the information gets back online and contributes to increased customer satisfaction, loyalty and revenue.

Turning now to FIG. 1, a block diagram illustrates one embodiment of system 100. The system 100 may include mobile devices, networks like the internet and a resilient messaging framework 110. The resilient messaging framework 110 includes components that are available to obtain credit information, verify payment and assign telephone numbers to promote continued processing of the customer application, and other systems and components necessary to assist or promote a retail store to provide a telecommunications services provider's services to a customer. The system 100 includes various telecommunication and information technology components.

The system 100 includes a resilient messaging framework 110 which may include one or more computer systems or networks of computer systems of a business enterprise as well as the software, application and systems operable on those computers. In the present embodiment, portions of this system may reside as a client, for example, on the retail store computer system so that the retail store computer system may temporarily operate independently of the resilient messaging framework 110. Other portions of the resilient messaging framework 110 may be or reside on, for example, a telecommunication provider's computer systems. In other embodiments, all of the components of the resilient messaging framework 110 reside on both the retail store 60 system and telecommunication provider's computer systems. Other combinations or dispositions of the resilient messaging framework 110 may be provided in other embodiments. Although system 100 is represented together, system 100 may be comprised of different components that are physically separate and operated by different businesses or entities or within a single system or combinations thereof.

The system 100 includes a telecommunication network 50 which may, for example, be a standard wired telephone network, analog, digital or other wireless telecommunication networks, the Internet, or any network operable for voice, data, video or other communication or telecommunication, or variations or combinations thereof. In the present embodiment, the telecommunication network 50 is operable, either alone or in concert with other systems to promote communication between a retail store 60 system and the telecommunication service provider computer systems such as the resilient messaging framework 110. The retail store 60 system may be computer system operable to promoted providing telecommunication services and may accept payment in the form of a check, credit card or other similar form of payment, for example PayPal, from the customer.

The financial system 70 may be a credit processing company, bank or other financial institution that verifies the credit card, debit card, check or other method of the payment is valid and then process the transactions. The financial system 70 may be a bank that verifies that the check is valid and that the checking account has sufficient funds or credit for the transaction. The principles of this disclosure apply to credit cards, debit cards, check processing and any other form of payment involving the authorization and transfer of funds between business enterprises. Although only one retail store 60 system and one financial system 70 are shown, any number of these entities and their systems may be present.

The system monitor 20 is operable to monitor the availability of the telecommunications service provider's back office computer system. The status of backend computer system availability is updated in a database 25 periodically. For example, the availability of the backend system may be updated in a database 25 every few seconds. In another embodiment, the time interval that the backend computer system is updated may be shorter or longer than two seconds. A client component (not shown) provided on the retail store 60 system may communicate with the system monitor 20 to update the retail store 60 system regarding the status of the resilient messaging framework 110 and its components.

In the preferred embodiment, the first credit component 30 is operable to obtain a first credit information or data for a customer. The first credit information is the best available data that the telecommunications service provider is able to obtain on the customer. For example, the telecommunications service provider's backend computer system may communicate with various external credit reporting agencies such as TransUnion, Equifax, Experian or other similar credit reporting agencies to obtain credit information for a customer. When the first credit information is unavailable or for other reasons the first credit component 30 cannot obtain the first credit information, a second credit component 32 is used to obtain a second credit information or data. The second credit component 32 may use statistical probabilities to classify risk based on a full spectrum of personal information, including but not limited to payment history, employment history, company position and age. Alternatively, the second credit component 32 may be data obtained and stored locally on the telecommunications provider's system or the retail store 60 computer system and used to determine the potential credit worthiness of the customer given the fact the customer's actual credit information is unavailable via the first credit component 30.

When neither the first or second credit component 30 and 32 and/or first and second credit information is available, a third credit component 34 is provided that is operable to assign a default credit score for the customer. A default credit score of seven hundred (700), for example, may used for the current customer transaction. In another embodiment a credit score higher or lower may be used as the default credit score.

In the preferred embodiment, the default credit scores may also be store locally at the retail store. Thus, the retail store may assign default credit scores to customers when the retail store is unable to communicate with either the telecommunications service provider computer system or the external credit reporting agencies. It should be appreciated that typical practice by telecommunications operators when credit information is unavailable is to not complete the transaction so that individuals with potentially poor credit scores are not provided with activated wireless phone service. However, the present invention is a significant advance since it has been realized that the rewards in terms of increased customer satisfaction and additional sales more than offset any potential risk associated with providing activated phone service to individuals with poor credit ratings. Further, once the systems become available, which may be only minutes or a few hours later, the system can then complete the transactions and verify the credit information.

In the event the credit information is unacceptable, the wireless service may then be deactivated. Also, once the customer service representative at an affiliated retail location experiences a transaction that fails to process for a customer, that representative may be reluctant to attempt any more sales for that vendor for perhaps the rest of the day. Therefore, a single failed transaction could easily lead to numerous lost sales.

The credit processor 36 is operable where the first credit information is available to process the customer application. When the first credit information is unavailable and the alternate credit information is available, the credit processor 36 is operable to use the alternate credit information to process the customer application. When the first and the alternate credit information are unavailable, the credit processor 36 is operable to use the default credit information to process the customer application. In the preferred embodiment, the first credit component 30, second credit component 32, third credit component 34 and credit processor 36 may be implemented as a single program or as multiple programs on one server or may be distributed over multiple servers. In the preferred embodiment, the first credit component 30 is provided on the telecommunications provider's backend system.

If the first credit component 30 was not available during the initial transactions and later becomes available, the first credit component 30 is used to obtain a customer's credit score although alternate data may have been used, such as assigning a default credit score to the customer. If the customer's actual credit score as obtained from the first credit component 30 is lower than what is permissible by the telecommunications service provider's company policy, alternate processes may be undertaken. For example, the customer's payment history may be more carefully monitored over a specified period of time, or the customer may be contacted and required to provide a deposit or other security to ensure payment of the account.

The payment component 38 is operable to obtain the first payment verification for customer payment. The first payment verification may be third party financial system 70 that the payment component 38 communicates with to verify the customer check, credit card, debit card or other similar method payment at the retail store 60. For example, the retail store 60 accepts a check, debit card or credit card payment for the purchase of a telecommunication product or service. The financial system 70 communicates with the relevant financial institution for authorization to ensure the customer's account has sufficient funds or credit for the purchase or transaction.

In some embodiments, the financial system 70 may be the relevant financial institution. A positive authorization allows the transaction to proceed and a negative authorization prevents the transaction from completing. If the first payment verification cannot be obtained or for other reasons the first payment verification cannot be accessed, an alternate data source may be used to estimate or make a determination regarding the customer's payment. In the preferred embodiment, database 25 may be used to maintain a list of invalid credit card numbers, bad credit information, and/or the names of customers or consumers that have written a check with insufficient funds, or maintain other credit information. For example, the information obtained from database 25 may determine that a potential customer had issued a bad check or that a credit card should not be accepted for a purchase or transaction.

The system may accept the customer's payment where the customer's payment is deemed validated by the second data source and is processed actually when the telecommunications service provider backend computer system comes back online. The retail store 60 cannot make a determination regarding the customer's payment is legitimate when the financial system 70 is unavailable. In the preferred embodiment, the alternate credit data may also be stored either at the telecommunication service provider system or locally at the retail store. Thus, the retail store 60 system may validate using at least the second best data, even when the financial system 70 is unavailable. In one embodiment, a default approval of any payment method may be accepted where both the financial system 70 and back-up second data source is unavailable for validating or verifying the method of payment. In this case, the method of payment would be accepted and transaction would be processed and the payment would be subsequently verified when one or both of the preferred systems, such as the financial system 70 become available again.

Where the form of payment was accepted, but subsequently identified as being unacceptable, the customer may be contacted or the service, such as wireless telecommunications service, might be terminated or suspended until the payment is corrected. Again the present system was the first to realize that the rewards in terms of increased customer satisfaction and additional sales more than offset any potential risk associated with a single payment failing to process.

While a customer is at the retail store obtaining service, such as for a new mobile telephone or device, a telephone number must be assigned to the device as part of a provisioning step. The provisioning component 40 is operable to obtain a telephone number to be assigned to the device from the telecommunications provider or other company that maintains the telephone numbers to for these purposes. Once the telephone number is obtained, it is assigned and provisioned to the device or telephone. However, if the provisioning component 40 is unable for any reason to communicate with the computer system that maintains the listing of telephone numbers, the provisioning component 40 is operable to obtain a telephone number from an alternate data source. For example, if the provisioning component 40 is unable to obtain a telephone number from the telecommunications provider, a telephone number may be obtained from a pool of telephone numbers stored in a database 25 accessible to the retail store 60 either locally or otherwise.

In the preferred embodiment, once the telecommunications provider computer system becomes available, the provisioning component 40 updates the t telecommunications provider computer systems with the numbers that were assigned to customer's mobile devices while the telecommunications provider computer system was unavailable. Thus, the retail store may assign telephone numbers to customers when the retail store is unable to communication with either the telecommunications service provider computer system or other system operable for providing or maintaining these numbers.

The automator component 42 is operable to process all of the business transactions that were temporarily stored in a database 25, whether locally at the retail store 60 system or remotely at the telecommunication provider's system, while the backend computer system was unavailable. The automator component 42 may automatically obtain and update the system with the necessary information or may interface with systems or persons at the retail store 60 or elsewhere to update and complete the transaction that would normally have occurred had the backend computer system been available. However, the automator component 42 will only start processing the business transactions that are stored in the database 25 if some or all of the backend computer system components (e.g., billing system, number management system, number porting system) are available. In some embodiments, all the systems that were unavailable might need to be available before running the update, while in other embodiments, the update may run as each system becomes available.

Figure 2:
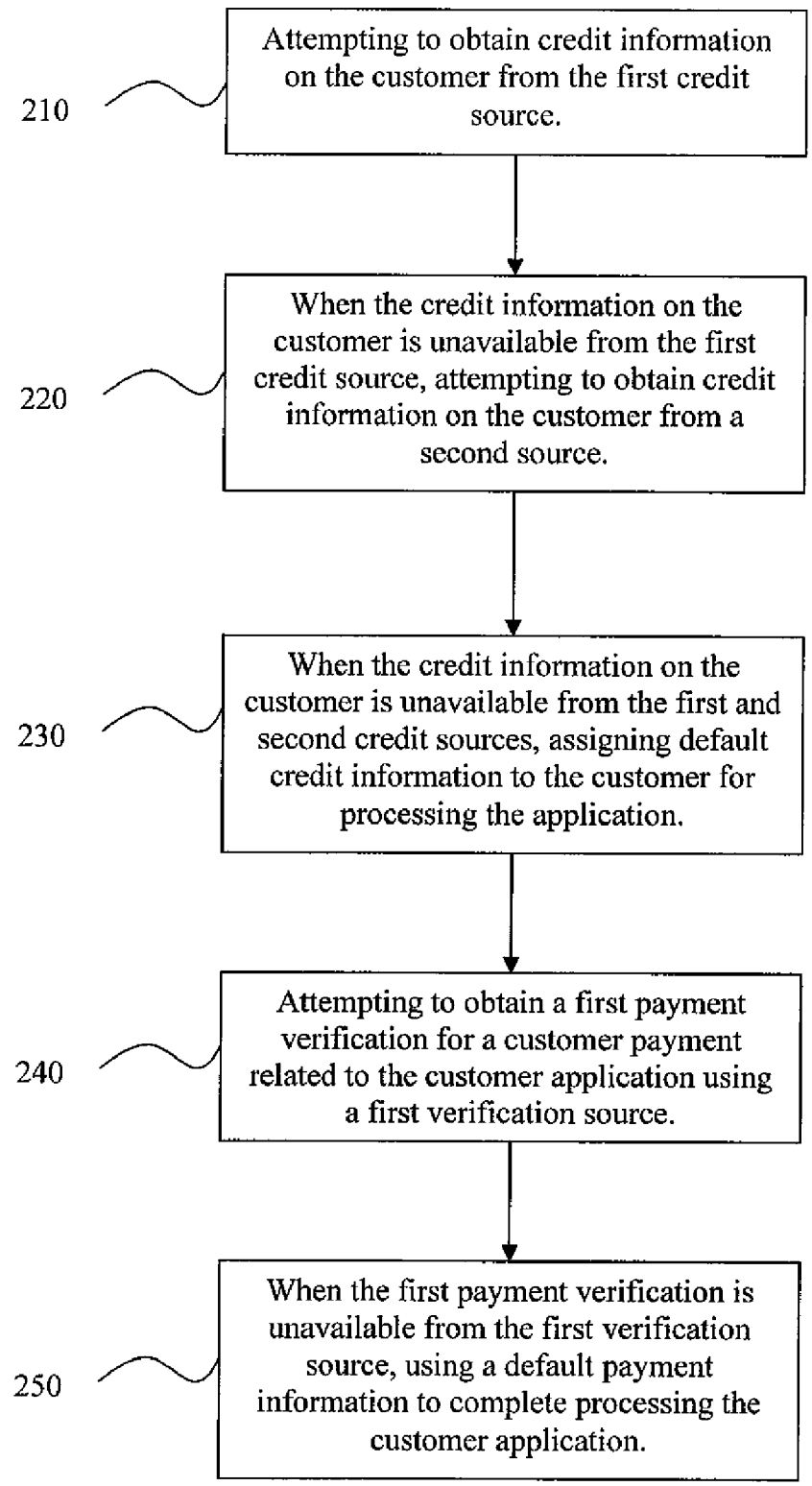
FIG. 2 is a process flow that depicts a method for processing a customer application for a wireless account.

FIG. 2 illustrates an embodiment of a method that might be used to process the customer application for a wireless mobile device at a retail store. In box 210, a credit processor attempts to obtain the credit information on the customer from the first credit source.

In box 220, when the credit information on the customer is unavailable from the first credit source, the credit processor attempts to obtain the credit information on the customer from a second source.

In box 230, when the credit information on the customer is unavailable from the first credit source and the second credit source, the credit component 36 assigns default credit information to the customer for processing the application.

In box 240, the payment component 38 attempts to obtain the first payment verification for the customer payment related to the customer application using the first verification source.

In box 250, when the first payment verification for the customer payment using the first verification source is unavailable, the payment component 38 uses stored information to determine whether or not to authorize the payment and complete the processing of the customer application.

Figure 3:
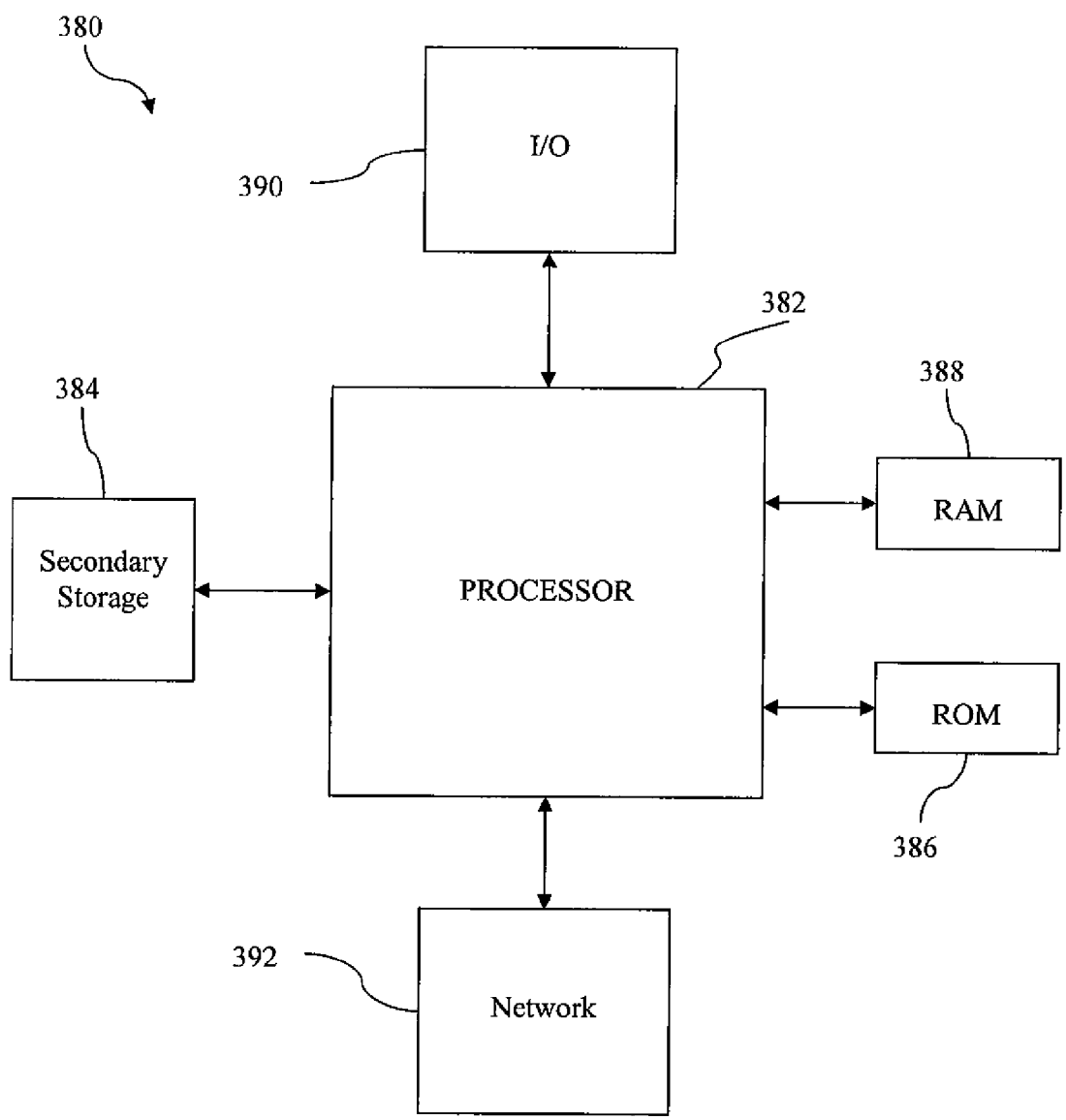
FIG. 3 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity 392 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A computer-implemented system for processing a customer application, comprising:
    a computer;
        a first credit component configured to obtain first credit information for a customer from a credit reporting agency, the first credit information indicative of a credit worthiness of the customer;
        a second credit component configured to obtain a second credit information other than a credit report for the customer from a source other than a credit reporting agency, the second credit information indicative of a credit worthiness of the customer;
        a third credit component configured to provide a default credit information for the customer, the third credit information indicative of a credit worthiness of the customer;
        a system monitor configured to monitor availability of the first and second credit components and to determine a status of availability for each of the first and second credit components;
        a credit processor configured to process the customer application to provision a wireless device of the customer using solely the first credit information when the first credit information is available, to process the customer application to provision the wireless device of the customer using solely the second credit information when the first credit information is unavailable based on the status of availability for the first credit component due to an outage of the first credit component and the second credit information is available, and to process the customer application to provision the wireless device of the customer using solely the default credit information when the first credit information is unavailable based on the status of availability for the first credit component due to an outage of the first credit component and the second credit information is unavailable based on the status of availability for the second credit component due to an outage of the second credit component; and
        a provisioning component configured to assign a telephone number to the wireless device based on processing the customer application.

2. The computer-implemented system of claim 1, wherein the customer is further defined as a wireless telephone applicant and wherein the account is further defined as a wireless telephone account.

3. The computer-implemented system of claim 2, wherein the first credit information is further defined as a current credit report for the customer, wherein the second credit information is further defined as an archived credit information, and wherein the third credit information is further defined as a default rating for customers.

4. The computer-implemented system of claim 1, further comprising:
    a payment component that obtains a first payment verification for a customer payment, and when the payment component is unable to obtain the first payment verification the payment component promotes continued processing of the customer application until the first payment verification is obtained.

5. The computer-implemented system of claim 4, wherein when the payment component is unable to obtain the first payment verification and the customer application is otherwise completed, validating the customer payment to complete the customer application.

6. The computer-implemented system of claim 4, wherein the first payment verification is selected from a group consisting of a check and credit card payment verifications.

7. The computer-implemented system of claim 4, further comprising a component that estimates whether the customer payment is acceptable based on other customer information.

8. The computer-implemented system of claim 4, wherein when the payment component is unable to obtain the first payment verification, and the payment component provides the payment identification to promote continued processing of the customer application, the payment component periodically attempts to obtain the first payment verification until the customer application is completed.

9. The computer-implemented system of claim 1, wherein the provisioning component obtains the telephone number from a first source, and when the first source is unavailable, the provisioning component obtains the telephone number from a second source having reserved telephone numbers.

10. A computer-implemented method for processing a customer application for a wireless account, comprising:
    monitoring, by a system monitor, availability of a first credit component and a second credit component;
    determining, by the system monitor, a status of availability for each of the first and second credit components;
    requesting a first credit information on a customer from a credit reporting agency by the first credit component, the first credit information indicative of a credit worthiness of the customer;

when the first credit information is available in response to requesting the first credit information, processing, by a credit processor, the customer application to provision a wireless device of the customer using solely the first credit information;

when the first credit information is unavailable based on the status of availability for the first credit component due to an outage of the first credit component in response to requesting the first credit information, requesting a second credit information other than a credit report on the customer from a second credit source other than a credit reporting agency by the second credit component, the second credit information indicative of a credit worthiness of the customer;

when the first credit information is unavailable based on the status of availability for the first credit component due to an outage of the first credit component in response to requesting the first credit information and the second credit information is available in response to requesting the second credit information, processing, by the credit processor, the customer application to provision the wireless device of the customer using solely the second credit information;

when the first credit information is unavailable based on the status of availability for the first credit component due to an outage of the first credit component in response to requesting the first credit information and the second credit information is unavailable based on the status of availability for the second credit component due to an outage of the second credit component in response to requesting the second credit information, assigning a default credit information to the customer, the default credit information indicative of a credit worthiness of the customer;

when the first credit information is unavailable based on the status of availability for the first credit component due to an outage of the first credit component in response to requesting the first credit information and the second credit information is unavailable based on the status of availability for the second credit component due to an outage of the second credit component in response to requesting the second credit information, processing, by the credit processor, the customer application to provision the wireless device of the customer using solely the default credit information;

requesting a first payment verification for a customer payment related to the customer application using a first verification source by a payment component;

when the first payment verification is unavailable from the first verification source in response to requesting the first payment verification, providing a payment identification to promote continued processing of the customer application until the first payment verification is obtained;

using a default payment information by the payment component when the first payment verification is unavailable to complete processing the customer application; and after at least one of obtaining the payment verification and using the default payment information, assigning a telephone number to the wireless device associated with the wireless account including:

obtaining the telephone number from a first source by a provisioning component, and when the first source is unavailable, obtaining the telephone number from a second source having reserved telephone numbers by the provisioning component.

11. The computer-implemented method of claim 10, wherein the first credit information on the customer from the first credit source is further defined as a current credit report, and wherein the credit information from the second credit source is further defined as archived credit information.

12. The computer-implemented method of claim 10, wherein the second source maintaining the reserved telephone numbers in a locally accessible database.

13. The computer-implemented method of claim 10, wherein the first payment verification from the first verification source is further defined as one of a check and credit card payment verification system.

14. The computer-implemented method of claim 10, wherein the default payment information includes whether the customer has issued a check with insufficient funds.

15. The computer-implemented method of claim 10, further comprising provisioning the wireless device of the wireless account for wireless communication.

16. The computer-implemented system of claim 1, wherein the second credit component classifies risk, based on personal information for the customer, according to statistical probabilities.

17. The computer-implemented system of claim 16, wherein the personal information includes at least one of a payment history, an employment history, an employment position, and age.

18. The computer-implemented system of claim 1 further comprising a payment component that obtains a first payment verification for a customer payment, wherein when the payment component is unable to obtain the first payment verification, the payment component provides a payment identification to promote continued processing of the customer application until the first payment verification is obtained, and wherein when the payment component is unable to obtain the first payment verification and the customer application is otherwise completed, the payment component validates the customer payment to complete the customer application.

19. The computer-implemented system of claim 18, wherein after assigning the telephone number to the wireless device, at least one of the first credit information and the first payment verification is obtained and a determination is made whether at least one of a payment obligation of the customer and a service provided to the customer will be altered in response to at least one of the obtained first credit information and the first payment verification.

20. The computer-implemented method of claim 19, wherein the at least one of a payment obligation of the customer and a service provided to the customer are selected from a group of actions consisting of more carefully monitoring the customer's payment history, requiring the customer to provide a deposit or other security to ensure payment of the account, and deactivating a wireless service provided to the wireless device.

* * * * *